(12) United States Patent
Levinshtein

(10) Patent No.: US 10,373,334 B2
(45) Date of Patent: Aug. 6, 2019

(54) COMPUTER PROGRAM, OBJECT TRACKING METHOD, AND OBJECT TRACKING DEVICE

(71) Applicant: SEIKO EPSON CORPORATION, Tokyo (JP)

(72) Inventor: Alex Levinshtein, Vaughn (CA)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/785,737

(22) Filed: Oct. 17, 2017

(65) Prior Publication Data

US 2018/0108149 A1     Apr. 19, 2018

(30) Foreign Application Priority Data

Oct. 19, 2016   (JP) .................................. 2016-204772

(51) Int. Cl.
  *G06F 3/03*      (2006.01)
  *G06T 7/73*      (2017.01)
  *G02B 27/01*     (2006.01)
  *G06F 3/01*      (2006.01)

(52) U.S. Cl.
  CPC ............ *G06T 7/74* (2017.01); *G02B 27/0172* (2013.01); *G06F 3/0304* (2013.01); *G06T 7/75* (2017.01); *G02B 2027/014* (2013.01); *G02B 2027/0138* (2013.01); *G06F 3/011* (2013.01); *G06T 2200/04* (2013.01)

(58) Field of Classification Search
  None
  See application file for complete search history.

(56) References Cited

U.S. PATENT DOCUMENTS

| | | | | |
|---|---|---|---|---|
| 9,886,528 B2* | 2/2018 | Rameau | ................... | G06T 17/00 |
| 9,940,553 B2* | 4/2018 | Shotton | .............. | G06K 9/00671 |
| 10,013,801 B2* | 7/2018 | Mehr | ....................... | G06F 17/11 |
| 10,083,538 B2* | 9/2018 | Li | ......................... | G02B 27/017 |
| 2012/0007943 A1* | 1/2012 | Tytgat | .................... | G01B 11/03 |
| | | | | 348/14.08 |

(Continued)

FOREIGN PATENT DOCUMENTS

JP      2005-038321 A     2/2005

OTHER PUBLICATIONS

A Method for Registration of 3-D Shapes Paul J. Bes!, Member, IEEE, and Neil D. McKay , 1992 IEEE; 1992.*

(Continued)

*Primary Examiner* — Nancy Bitar
(74) *Attorney, Agent, or Firm* — Oliff PLC

(57) ABSTRACT

A computer program causes an object tracking device to realize functions of: acquiring a first image of a scene including an object captured with a camera positioned at a first position; deriving a 3D pose of the object in a second image captured with the camera positioned at a second position using a 3D model corresponding to the object; deriving 3D scene feature points of the scene based at least on the first image and the second image; obtaining a 3D-2D relationship between 3D points represented in a 3D coordinate system of the 3D model and image feature points on the second image; and updating the derived pose using the 3D-2D relationship, wherein the 3D points include the 3D scene feature points and 3D model points on the 3D model.

5 Claims, 6 Drawing Sheets

(56) References Cited

U.S. PATENT DOCUMENTS

| | | | | |
|---|---|---|---|---|
| 2014/0340489 A1* | 11/2014 | Medioni | ............... | G06K 9/46 |
| | | | | 348/50 |
| 2014/0363048 A1* | 12/2014 | Vrcelj | ............... | G06K 9/78 |
| | | | | 382/103 |
| 2017/0004648 A1* | 1/2017 | Li | ............... | G02B 27/017 |

OTHER PUBLICATIONS

Lepetit, Vincent et al., "Monocular Model-Based 3D Tracking of Rigid Objects: A Survey", Foundations and Trend in Computer Graphics and Vision, 2005, vol. 1, No. 1, pp. 1-89.

Leonard, John J. et al., "Simultaneous Map Building and Localization for an Autonomous Mobile Robot", in IROS, 1991, pp. 1442-1447.

Salas-Moreno, Renato F. et al., "SLAM++: Simultaneous Localisation and Mapping at the Level of Objects", in CVPR, 2013, pp. 1-7.

\* cited by examiner

COMPUTER PROGRAM, OBJECT TRACKING METHOD, AND OBJECT TRACKING DEVICE

BACKGROUND

1. Technical Field

This disclosure relates to the tracking of an object.

2. Related Art

Renato F. Salas-Moreno, Richard A. Newcombe, Hauke Strasdat, Paul H. J. Kelly, Andrew J. Davison, "SLAM++: Simultaneous Localisation and Mapping at the Level of Objects," CVPR (Conference on Computer Vision and Pattern Recognition) (United States), IEEE (Institute of Electrical and Electronics Engineers), 2013, p. 1352-1359 discloses SLAM. SLAM is the abbreviation of simultaneous localization and mapping and refers to a method of simultaneously realizing localization and environmental mapping.

SUMMARY

SLAM can be implemented on the assumption that a scene or a 3D model of an object included in the scene is unknown. However, the 3D model being unknown is disadvantageous in tracking the 3D object, that is, estimating the 3D pose of the object to the camera.

An advantage of some aspects of this disclosure is to improve the accuracy of tracking the 3D pose of an object.

The advantage can be achieved in the following configurations.

An aspect of the disclosure is directed to a non-transitory computer readable medium that embodies instructions that cause one or more processors to perform a method including: acquiring a first image of a scene including an object captured with a camera positioned at a first position; deriving a 3D pose of the object in a second image captured with the camera positioned at a second position using a 3D model corresponding to the object; deriving 3D scene feature points of the scene based at least on the first image and the second image; obtaining a 3D-2D relationship between 3D points represented in a 3D coordinate system of the 3D model and image feature points on the second image; and updating the derived pose using the 3D-2D relationship, wherein the 3D points include the 3D scene feature points and 3D model points on the 3D model. According to this configuration, since the information of the scene is used in deriving the pose of the object, the accuracy of tracking the pose of the object is improved.

In another aspect of the disclosure, deriving the 3D scene feature points may be realized with a triangulation method or a bundle adjustment method. According to this configuration, the 3D scene feature points can be properly derived.

In still another aspect of the disclosure, the method further includes detecting a 3D pose of the object in the first image. According to this configuration, the detection of the pose of the object need not be carried out each time.

The technique in the disclosure can be realized in various other forms than the above. For example, the technique can be realized as a tracking method, or in the form of a device realizing this method.

Another aspect of the disclosure is directed to a method for tracking an object, including: acquiring a first image of a scene including an object captured with a camera positioned at a first position; deriving a 3D pose of the object in a second image captured with the camera positioned at a second position using a 3D model corresponding to the object; deriving 3D scene feature points of the scene based at least on the first image and the second image; obtaining a 3D-2D relationship between 3D points represented in a 3D coordinate system of the 3D model and image feature points on the second image; and updating the derived pose using the 3D-2D relationship, wherein the 3D points include the 3D scene feature points and 3D model points on the 3D model.

Another aspect of the disclosure is directed to an object tracking device including functions of: acquiring a first image of a scene including an object captured with a camera positioned at a first position; deriving a 3D pose of the object in a second image captured with the camera positioned at a second position using a 3D model corresponding to the object; deriving 3D scene feature points of the scene based at least on the first image and the second image; obtaining a 3D-2D relationship between 3D points represented in a 3D coordinate system of the 3D model and image feature points on the second image; and updating the derived pose using the 3D-2D relationship, wherein the 3D points include the 3D scene feature points and 3D model points on the 3D model.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Figure 1:
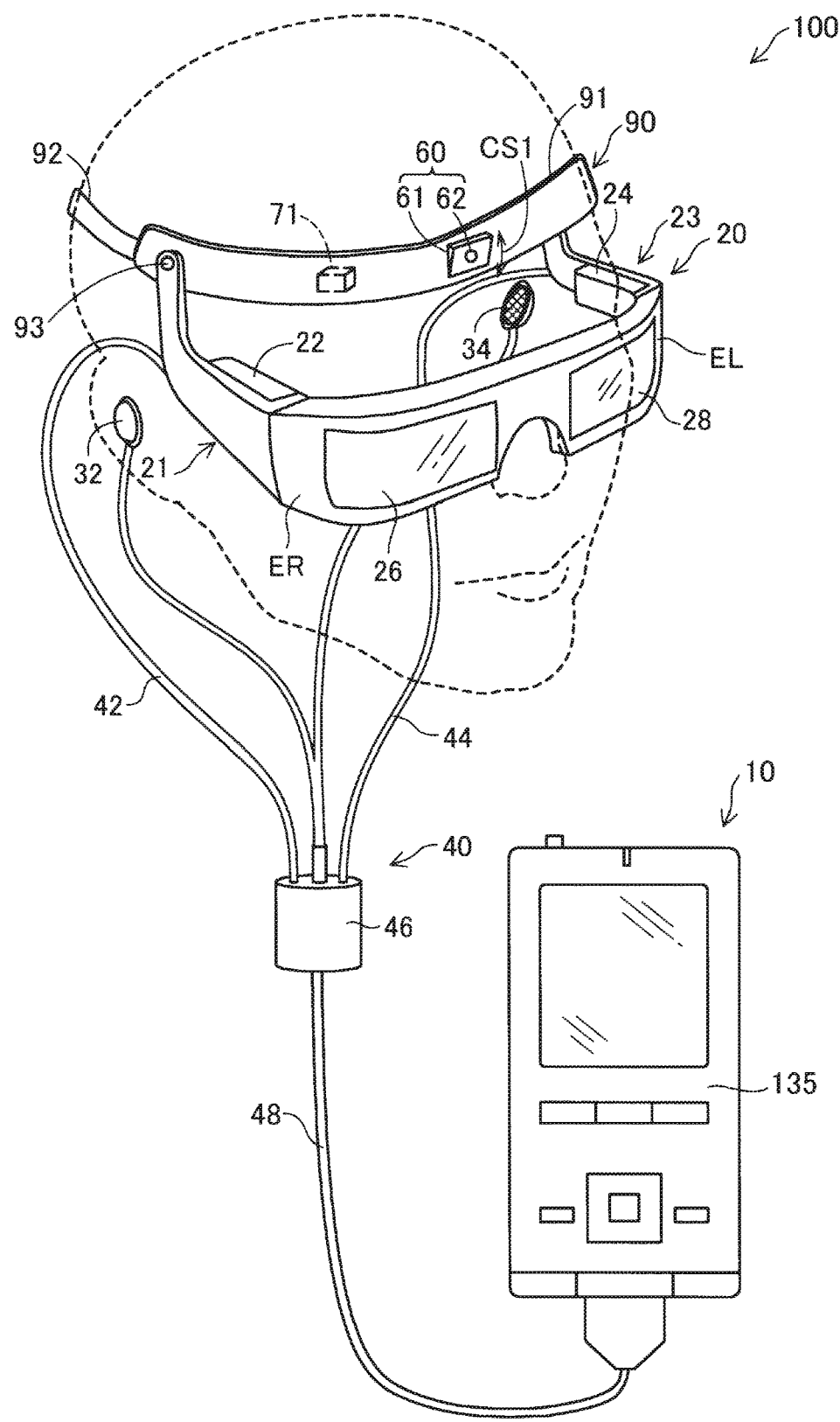
FIG. 1 shows the schematic configuration of an HMD.

FIG. 1 shows the schematic configuration of an HMD 100. The HMD 100 is a head-mounted display. The HMD 100 is an optical transmitting-type device. That is, the HMD 100 can allow the user to perceive a virtual image and at the same time directly visually recognize light coming from the external scenery (scene) including an object. The HMD 100 functions as a tracking device which tracks an object, as described later.

The HMD 100 has an attachment strap 90 which can be attached to the head of the user, a display section 20 which displays an image, and a control section 10 which controls the display section 20. The display section 20 allows the user to perceive a virtual image in the state where the HMD 100 is mounted on the head of the user. The display section 20 allowing the user to perceive a virtual image is also referred to as "displaying AR". The virtual image perceived by the user is also referred to as an AR image.

The attachment strap 90 includes a wearing base section 91 made of resin, a cloth belt section 92 connected to the wearing base section 91, a camera 60, and an inertial sensor 71. The wearing base section 91 is curved to follow the shape of the human forehead. The belt section 92 is attached around the head of the user.

The camera 60 is an RGB sensor and functions as an image pickup unit. The camera 60 can capture an image of external scenery and is arranged at a center part of the wearing base section 91. In other words, the camera 60 is arranged at a position corresponding to the middle of the forehead of the user in the state where the attachment strap 90 is attached to the head of the user. Therefore, in the state where the user wears the attachment strap 90 on his/her head, the camera 60 captures an image of external scenery, which is the scenery of the outside in the direction of the user's line of sight, and acquires a captured image, which is an image captured of the external scenery.

The camera 60 includes a camera base 61 which rotates about the wearing base section 91, and a lens part 62 fixed in relative position to the camera base 61. The camera base 61 is arranged in such a way as to be able to rotate along an arrow CS1, which is a predetermined range of an axis included in the plane including the center axis of the user when the attachment strap 90 is attached to the head of the user. Therefore, the optical axis of the lens part 62, which is the optical axis of the camera 60, is changeable in direction within the range of the arrow CS1. The lens part 62 captures a range which changes according to zooming in or out about the optical axis.

The inertial sensor 71 is a sensor which detects acceleration, and is hereinafter referred to as an IMU (inertial measurement unit) 71. IMU 71 can detect angular velocity and geomagnetism in addition to acceleration. The IMU 71 is arranged inside the wearing base section 91. Therefore, the IMU 71 detects the acceleration, angular velocity and geomagnetism of the attachment strap 90 and the camera base 61.

Since the IMU 71 is fixed in relative position to the wearing base section 91, the camera 60 is movable with respect to the IMU 71. Also, since the display section 20 is fixed in relative position to the wearing base section 91, the camera 60 is movable in relative position to the display section 20.

The display section 20 is connected to the wearing base section 91 of the attachment strap 90. The display section 20 is in the shape of eyeglasses. The display section 20 includes a right holding section 21, a right display drive section 22, a left holding section 23, a left display drive section 24, a right optical image display section 26, and a left optical image display section 28.

The right optical image display section 26 and the left optical image display section 28 are situated in front of the right and left eyes of the user, respectively, when the user wears the display section 20. One end of the right optical image display section 26 and one end of the left optical image display section 28 are connected together at a position corresponding to the glabella of the user when the user wears the display section 20.

The right holding section 21 has a shape extending substantially in a horizontal direction from an end part ER, which is the other end of the right optical image display section 26, and tilted obliquely upward from a halfway part. The right holding section 21 connects the end part ER with a coupling section 93 on the right-hand side of the wearing base section 91.

Similarly, the left holding section 23 has a shape extending substantially in a horizontal direction from an end part EL, which is the other end of the left optical image display section 28, and tilted obliquely upward from a halfway part. The left holding section 23 connects the end part EL with a coupling section (not illustrated) on the left-hand side of the wearing base section 91.

As the right holding section 21 and the left holding section 23 are connected to the wearing base section 91 via the right and left coupling sections 93, the right optical image display section 26 and the left optical image display section 28 are situated in front of the eyes of the user. The respective coupling sections 93 connect the right holding section 21 and the left holding section 23 in such a way that these holding sections can rotate and can be fixed at arbitrary rotating positions. As a result, the display section 20 is provided rotatably to the wearing base section 91.

The right holding section 21 is a member extending from the end part ER, which is the other end of the right optical image display section 26, to a position corresponding to the temporal region of the user when the user wears the display section 20.

Similarly, the left holding section 23 is a member extending from the end part EL, which is the other end of the left optical image display section 28, to a position corresponding to the temporal region of the user when the user wears the display section 20. The right display drive section and the left display drive section 24 (hereinafter collectively referred to as the display drive sections) are arranged on the side facing the head of the user when the user wears the display section 20.

The display drive sections include a right liquid crystal display 241 (hereinafter right LCD 241), a left liquid crystal display 242 (hereinafter left LCD 242), a right projection optical system 251, a left projection optical system 252 and the like. Detailed explanation of the configuration of the display drive sections will be given later.

The right optical image display section 26 and the left optical image display section 28 (hereinafter collectively referred to as the optical image display sections) include a right light guide plate 261 and a left light guide plate 262 (hereinafter collectively referred to as the light guide plates) and also include a light control plate. The light guide plates are formed of a light-transmissive resin material or the like and guide image light outputted from the display drive section to the eyes of the user.

The light control plate is a thin plate-like optical element and is arranged in such a way as to cover the front side of the display section 20, which is opposite to the side of the eyes of the user. By adjusting the light transmittance of the light control plate, the amount of external light entering the user's eyes can be adjusted and the visibility of the virtual image can be thus adjusted.

The display section 20 also includes a connecting section 40 for connecting the display section 20 to the control section 10. The connecting section 40 includes a main body cord 48, a right cord 42, a left cord 44, and a connecting member 46.

The right cord 42 and the left cord 44 are two branch cords split from the main body cord 48. The display section 20 and the control section 10 execute transmission various signals via the connecting section 40. For the right cord 42, the left cord 44 and the main body cord 48, metal cables or optical fibers can be employed, for example.

The control section 10 is a device for controlling the HMD 100. The control section 10 has an operation section 135 including an electrostatic track pad or a plurality of buttons can be pressed, or the like. The operation section 135 is arranged on the surface of the control section 10.

Figure 2:
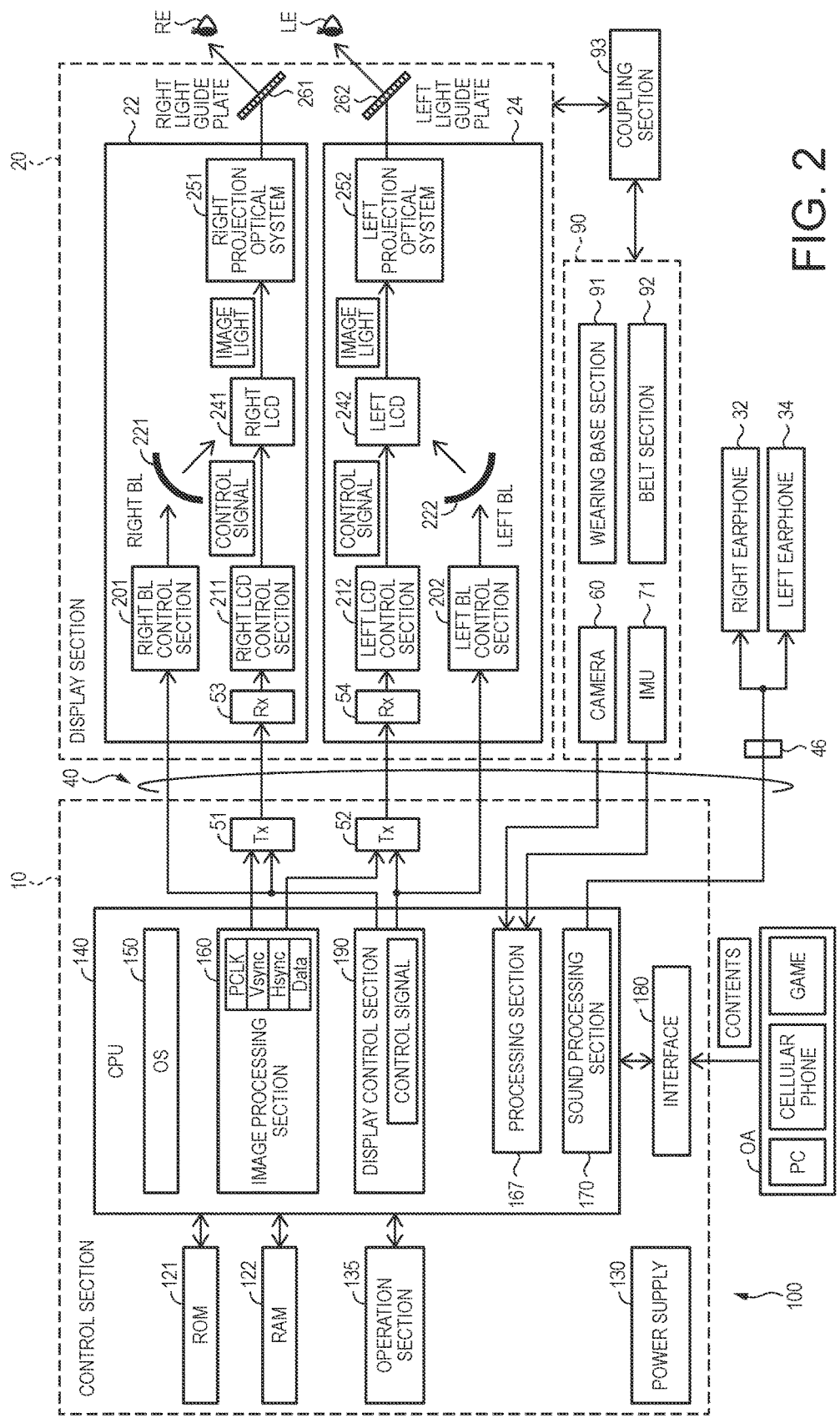
FIG. 2 is a functional block diagram of the HMD.

FIG. 2 is a block diagram functionally showing the configuration of the HMD 100. As shown in FIG. 2, the control section 10 has a ROM 121, a RAM 122, a power supply 130, the operation section 135, a CPU 140, an interface 180, a sending section 51 (Tx51), and a sending section 52 (Tx52).

The power supply 130 supplies electricity to each part of the HMD 100. In the ROM 121, various programs are stored. The CPU 140 develops the various programs stored in the ROM 121 into the RAM 122 and thus executes the various programs. The various programs include a program for realizing pose update processing, described later.

The CPU 140 develops programs stored in the ROM 121 into the RAM 122 and thus functions as an operating system 150 (OS 150), a display control section 190, a sound processing section 170, an image processing section 160, and a processing section 167.

The display control section 190 generates a control signal to control the right display drive section 22 and the left display drive section 24. The display control section 190 controls the generation and emission of image light by each of the right display drive section 22 and the left display drive section 24.

The display control section 190 sends each of control signals for a right LCD control section 211 and a left LCD control section 212 via the sending sections 51 and 52. The display control section 190 sends each of control signals for a right backlight control section 201 and a left backlight control section 202.

The image processing section 160 acquires an image signal included in a content and sends the acquired image signal to a receiving section 53 and a receiving section 54 of the display section 20 via the sending section 51 and the sending section 52. The sound processing section 170 acquires an audio signal included in a content, then amplifies the acquired audio signal, and supplies the amplified audio signal to a speaker (not illustrated) in a right earphone 32 connected to the connecting member 46 or to a speaker (not illustrated) in a left earphone 34.

The processing section 167 calculates a pose of an object by homography matrix, for example. The pose of an object is the spatial relationship between the camera 60 and the object. The processing section 167 calculates a rotation matrix to convert from a coordinate system fixed on the camera to a coordinate system fixed on the IMU 71, using the calculated spatial relationship and the detection value of acceleration or the like detected by the IMU 71. The functions of the processing section 167 are used for the pose update processing, described later.

The interface 180 is an input/output interface for connecting various external devices OA which serve as content supply sources, to the control section 10. The external devices OA may include a storage device, personal computer (PC), cellular phone terminal, game terminal and the like storing an AR scenario, for example. As the interface 180, a USB interface, micro USB interface, memory card interface or the like can be used, for example.

The display section 20 has the right display drive section 22, the left display drive section 24, the right light guide plate 261 as the right optical image display section 26, and the left light guide plate 262 as the left optical image display section 28. In this embodiment, the parameter representing the 3D-3D spatial relationship between the display section 20 and the camera 60, and the 3D-2D mapping parameter (rendering parameter) of the display section 20 are known and stored in the ROM or RAM. Using these parameters and the pose of the object represented on the camera coordinate system, the CPU 140 can render, that is, display a 3D CG model (AR) on the display section 20 so as to allow the user to visually recognize the state where the position and pose of the object coincide with the position and pose of the AR.

The right display drive section 22 includes the receiving section 53 (Rx53), the right backlight control section 201, a right backlight 221, the right LCD control section 211, the right LCD 241, and the right projection optical system 251. The right backlight control section 201 and the right backlight 221 function as a light source.

The right LCD control section 211 and the right LCD 241 function as a display element. Meanwhile, in other embodiments, the right display drive section 22 may have a self-light-emitting display element such as an organic EL display element, or a scanning display element which scans the retina with a light beam from a laser diode, instead of the above configuration. The same applies to the left display drive section 24.

The receiving section 53 functions as a receiver for serial transmission between the control section 10 and the display section 20. The right backlight control section 201 drives the right backlight 221, based on a control signal inputted thereto. The right backlight 221 is a light-emitting member such as an LED or electroluminescence (EL), for example. The right LCD control section 211 drives the right LCD 241, based on control signals sent from the image processing section 160 and the display control section 190. The right LCD 241 is a transmission-type liquid crystal panel in which a plurality of pixels is arranged in the form of a matrix.

The right projection optical system 251 is made up of a collimating lens which turns the image light emitted from the right LCD 241 into a parallel luminous flux. The right light guide plate 261 as the right optical image display section 26 guides the image light outputted from the right projection optical system 251 to the right eye RE of the user while reflecting the image light along a predetermined optical path. The left display drive section 24 has a configuration similar to that of the right display drive section 22 and corresponds to the left eye LE of the user and therefore will not be described further in detail.

Calibration using the IMU 71 and the camera 60 varies in accuracy, depending on the capability of the IMU 71 as an inertial sensor. If an inexpensive IMU with lower accuracy is used, significant errors and drifts may occur in the calibration.

In the embodiment, calibration is executed, based on a batch solution-based algorithm using a multi-position method with the IMU 71. In the embodiment, design data obtained in manufacturing is used for the translational relationship between the IMU 71 and the camera 60.

Calibration is executed separately for the IMU 71 and for the camera 60 (hereinafter referred to as independent calibration). As a specific method of independent calibration, a known technique is used.

In the independent calibration, the IMU 71 is calibrated. Specifically, with respect to a 3-axis acceleration sensor (Ax, Ay, Az), a 3-axis gyro sensor (Gx, Gy, Gz), and a 3-axis geomagnetic sensor (Mx, My, Mz) included in the IMU 71, the gain/scale, static bias/offset, and skew among the three axes are calibrated.

As these calibrations are executed, the IMU 71 outputs acceleration, angular velocity, and geomagnetism, as output values of the respective sensors for acceleration, angular velocity, and geomagnetism. These output values are obtained as the result of correcting the gain, static bias/offset, and misalignment among the three axes. In the embodiment, these calibrations are carried out at a manufacturing plant or the like at the time of manufacturing the HMD 100.

In the calibrations on the camera 60 executed in the independent calibration, internal parameters of the camera 60 including focal length, skew, position of cardinal point, and distortion are calibrated. A known technique can be employed for the calibration on the camera 60.

After the calibration on each sensor included in the IMU 71 is executed, the detection values (measured outputs) from the respective sensors for acceleration, angular velocity, and geomagnetism in the IMU 71 are combined. Thus, IMU orientation with high accuracy can be realized.

An outline of the pose update processing will be described. (1) Using advantages of a high-accuracy 3D model, high-accuracy 3D feature elements on the surface of an object including its edges are obtained. (2) Using additional feature elements in the surrounding scene, the tracker is made more robust against unfavorable appearances of the object and ultimately against the complete shielding of the object or the absence of the object from the field of view. The post update processing enables highly accurate estimation of the pose of the object and robust tracking of the pose estimated with high accuracy.

The processing described above will now be supplemented.

In the description below, it is assumed that the user moves and thereby causes the position of the camera 60 to move (including rotations), and a case (scenario) of tracking an object that is static to a scene (background) is considered as an example. This scenario is often observed in an augmented reality application or in a visual servo in robotics.

The tracker based on a 3D model is used to estimate the pose of the camera 60 to the object. The pose of the camera 60 to the object can also be understood as the pose of the object to the camera 60.

However, if feature elements are tracked only in an insufficient amount on the object, the reliability of the tracking is reduced. The tracking of feature elements can be insufficient due to the small object size, the occlusion (shielding) of the object, and/or the appearance of the object.

Thus, the SLAM method enables the tracking of the entire scene. Since the entire scene can be tracked, the reliability of this method can be high even in the case where the appearance of the object included in the scene is not preferable.

According to the SLAM method, the restored 3D structure is not so accurate as the known 3D models and therefore the result of the tracking is not highly accurate.

Moreover, detecting an object (real object) corresponding to a 3D model in the scene may be necessary for the purpose of superimposing augmented reality information or operating a robot. This also applies to the case of using the SLAM method. Thus, in the embodiment, the 3D model-based tracking technique and model-free SLAM are integrated together.

The method in the embodiment begins with the use of 3D object tracking based on a standard model. Here, 3D feature elements on the surface of the object are tracked from one frame to another and are used to update the pose of the camera 60.

In addition, in the embodiment, feature elements of the scene continue to be tracked while multiple 2D tracks are generated. The generation of multiple 2D tracks means that a 2D track is generated for each scene feature element tracked. Each track stores a 2D position for each frame of the tracked feature element and a 3D camera pose for each frame estimated using a 3D model-based tracker.

Next, this information is used to restore the 3D position of the scene feature elements, using a triangulation method or a bundle adjustment method. When additional 3D scene feature elements become available, these can be added to a 3D-2D relationship list when the camera pose is estimated for future frames.

Finally, the 3D positions of scene points are improved further by bundle adjustment, once additional frames having observed scene feature elements become available.

The processing described above will now be explained, using a flowchart.

Figure 3:
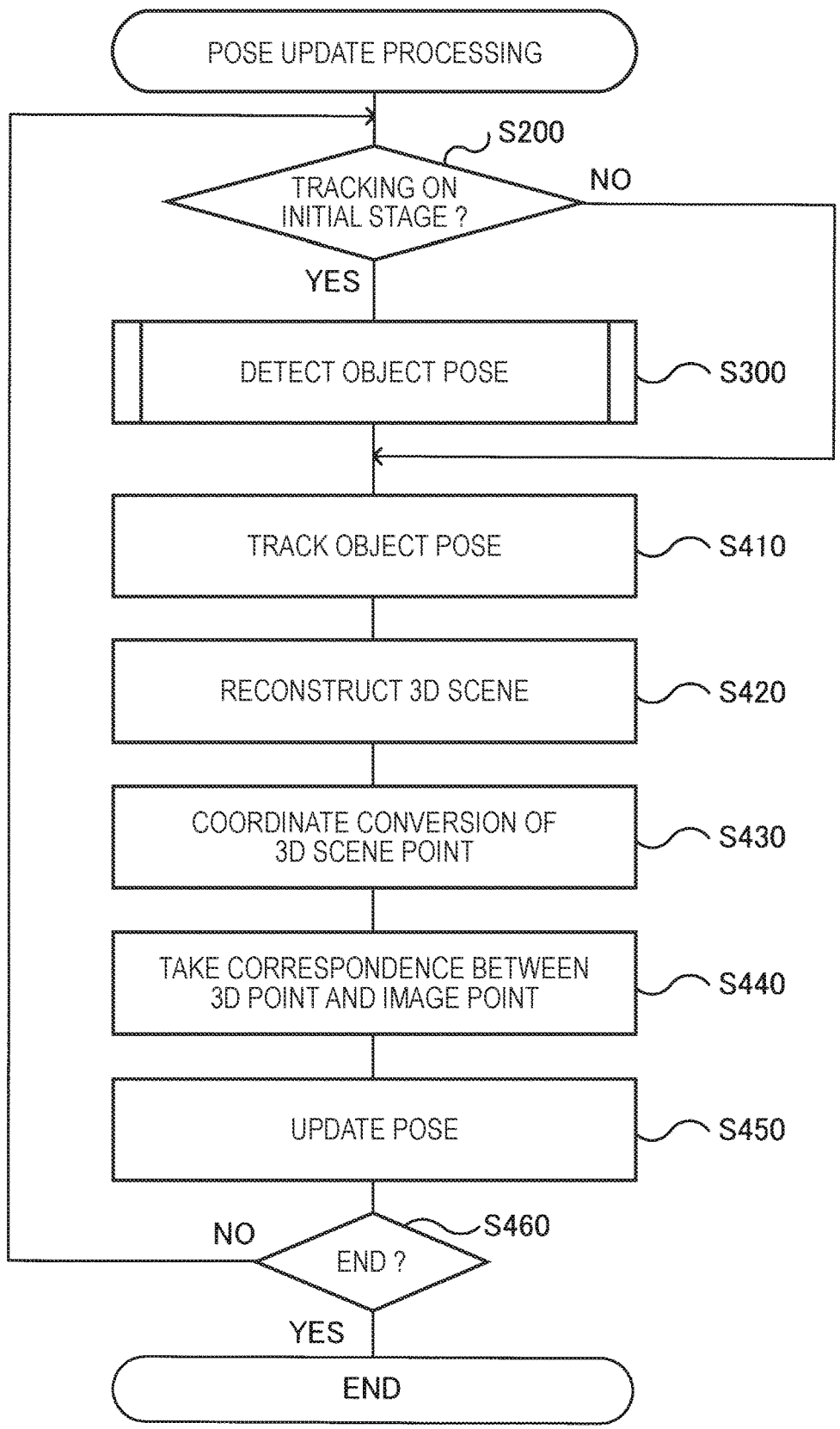
FIG. 3 is a flowchart showing pose update processing.

FIG. 3 is a flowchart showing the pose update processing. The agent executing each step included in the pose update processing is the CPU 140.

First, whether the tracking is on its initial stage or not is determined (S200). If the pose of the object is captured, the tracking is not on its initial stage. Meanwhile, if the pose of the object is lost, the tracking is on its initial stage. The case where the pose of the object is lost includes the case where the pose has never been captured and the case where the pose captured in the past has been lost.

If the tracking is on its initial stage (S200, YES), the pose of the object is detected (S300). The detection of the pose of the object refers to deciding a conversion matrix (R:T) representing rotations (R) and translations (T) on a coordinate system (camera coordinate system) where the camera 60 is the origin. In the embodiment, tracking the pose is synonymous with optimizing this conversion matrix (R:T).

Executing S300 in the case where the pose has never been captured is referred to as initialization. Executing S300 in the case where the pose captured in the past has been lost is referred to re-initialization.

Figure 4:
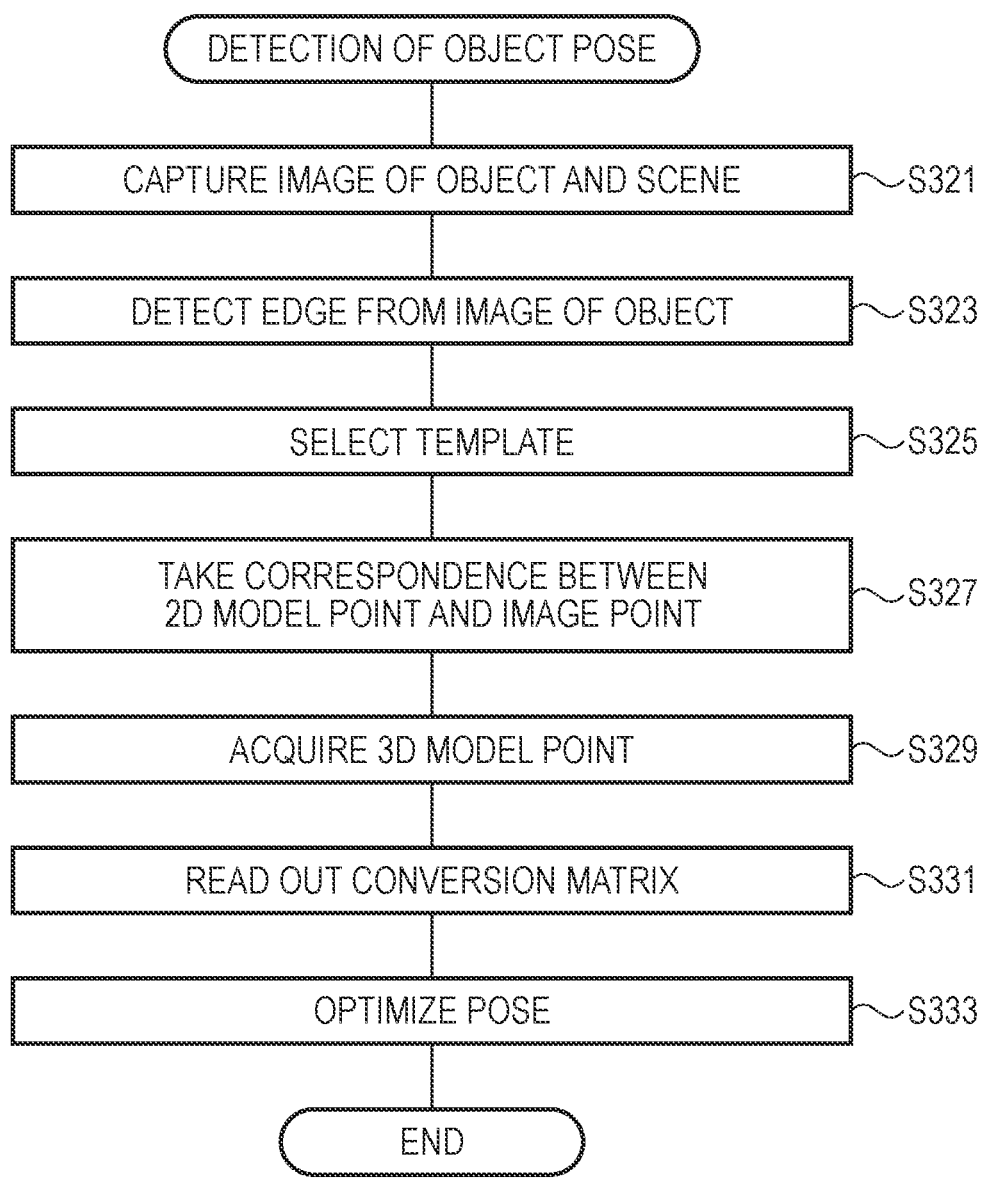
FIG. 4 is a flowchart showing the detection of an object pose.
Figure 5:
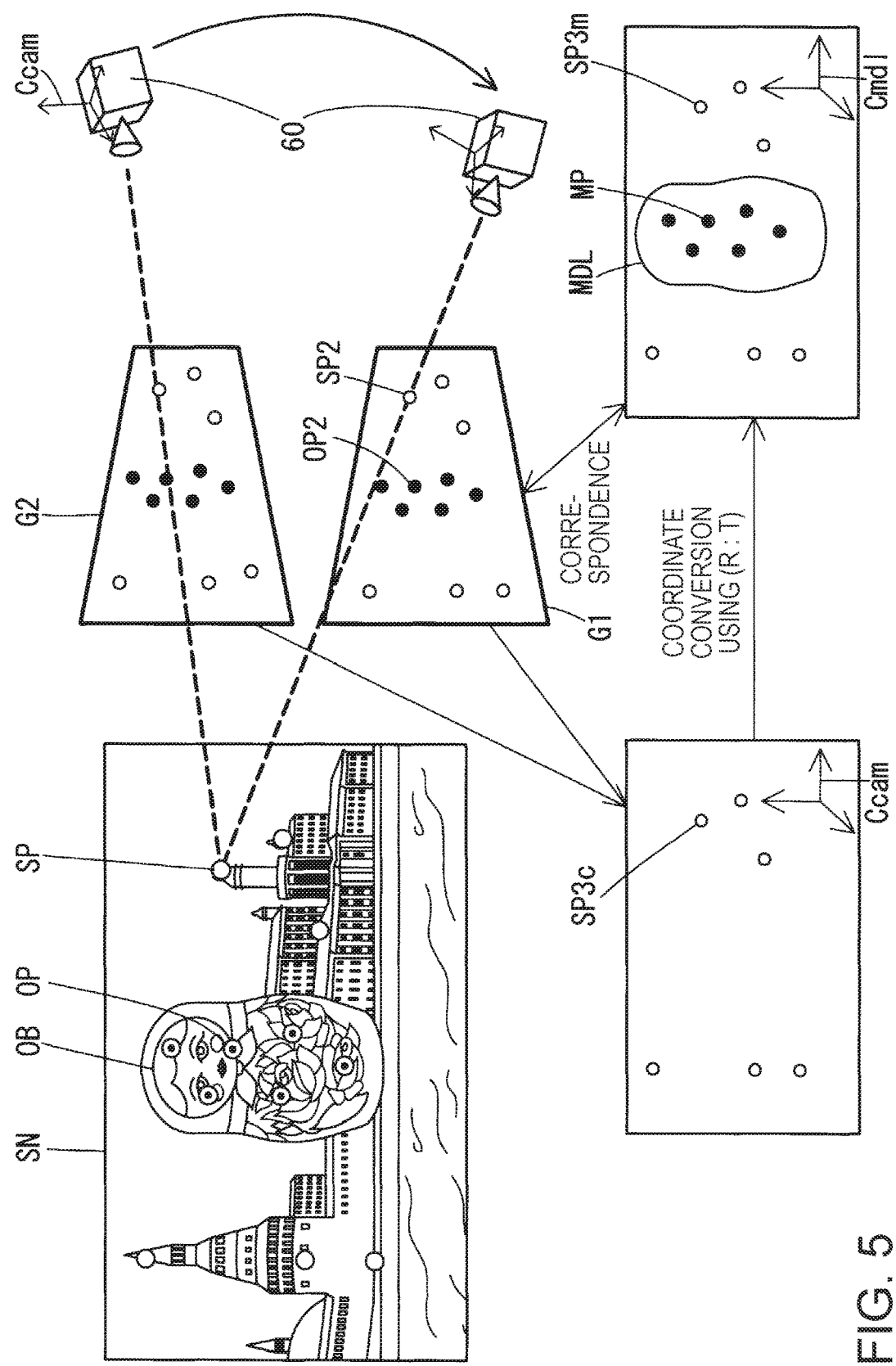
FIG. 5 shows the way an image of an object and a scene is captured from two different positions.

FIG. 4 is a flowchart showing the detection of the pose of the object. First, a captured image of a scene including an object OB is acquired using the camera 60 (S321). FIG. 5 shows the way an image of the object OB and the scene SN is captured.

Next, on the captured image of the object OB, the following edge detection is executed (S323).

S323 is executed in order to take correspondence between the object OB captured in the image and a 2D template. The 2D template corresponds to the object OB captured in the image and also reflects the position and pose of the object OB. The control section 10 has a plurality of 2D templates stored therein in advance.

Here, each 2D template is data prepared based on a 2D model obtained by rendering a 3D model corresponding to the object OB in question, onto a virtual image plane, based on its own view.

The view includes a 3D rigid body conversion matrix representing rotations and translations with respect to a virtual camera and a perspective image (perspective projection) conversion matrix including camera parameters. Specifically, each 2D template includes 2D model points representing 2D model feature points (in this embodiment, points included in the edges), 3D model points corresponding to these 2D model points, and the view. The 2D model points are expressed on a 2D coordinate system (image plane coordinate system) having the origin on the image plane. The 3D model points are expressed on a 3D coordinate system (3D model coordinate system) where the origin is fixed to a 3D model.

To detect an edge, feature elements forming the edge are calculated, based on pixels in the captured image. In the embodiment, the gradient of luminance is calculated for each pixel in the captured image of the object OB, thereby deciding feature elements. In the embodiment, in order to detect an edge, edges are simply compared with a threshold and those not reaching the maximum are suppressed (non-maxima suppression), as in the procedures of the canny edge detection method.

Next, of the plurality of 2D templates that is stored, a 2D template generated from the view that is closest to the pose of the object OB in the captured image is selected (S325).

For this selection, an existing 3D pose estimation algorithm for roughly estimating the pose of the object OB may be separately used.

However, when improving the accuracy of the 3D pose, a new view that is closer to the pose of the object OB in the image than the already selected view may be found. If such a new view is found, the improvement in the accuracy of the 3D pose in the new view is carried out.

In other embodiments, instead of using prepared 2D templates, an image of the object OB may be captured and a 2D template including a 2D model may be prepared from 3D CAD data while reflecting image capture environment such as lighting onto the rendering, on the fly and if necessary, thereby extracting as many edges as possible.

Subsequently, the correspondence between image points included in the edge of the image of the object OB and 2D model points included in the 2D template is taken (S327).

In the embodiment, similarity scores are calculated with respect to all image points included in the local vicinities of each projected 2D model point. For the calculation of similarity scores, a known technique is employed.

Next, 3D model points corresponding to the 2D model points corresponding to the image points, and information of the view obtained at the time of preparing the 2D model points, are acquired (S329).

Next, a conversion matrix representing the acquired view is read out (S331). The conversion matrix refers to a 3D rigid body conversion matrix expressed by a coordinate system where the camera 60 is the origin and a perspective image (perspective projection) conversion matrix.

Finally, the pose of the object OB captured in the image by the camera 60 is optimized (S333). This optimization completes the initialization of the pose. S333 is executed by repeated calculations to derive an optimum rotational matrix and translational matrix, based on the image points, 3D model points corresponding to the image points, and the view acquired in S331.

Meanwhile, if the tracking is not on its initial stage (S200, NO), the object detection processing is skipped.

Subsequently, the pose of the object OB is tracked (S410). The tracking of the pose of the object OB is carried out, based on the captured image at the current position and the conversion matrix (R:T) acquired most recently. If it is immediately after the detection of the pose of the object is executed, the most recently acquired conversion matrix (R:T) represents this detected pose. If it is not immediately after the detection of the pose of the object is executed, the most recently acquired conversion matrix (R:T) represents the pose updated in S450, described later.

The captured image at the current position is also referred to as a first image. The current position is also referred to as a first position. In FIG. 5, the captured image at the current position is expressed as an image G1.

Next, using the pose of the object, a 3D scene (background structure) corresponding to the first image is reconstructed (S420). That is, the position of each of 3D scene feature points SP corresponding to the first image is found as the position of a 3D scene point SP3$c$ on a camera coordinate system Ccam. When carrying out S420, a plurality of 2D scene points SP2 is selected from the captured image, as scene feature elements.

In S420, a triangulation method or a bundle adjustment method is used. In S420, the captured image at the current position and a captured image at a different position (including position and/or angle) at a different time point from the current time (for example, the next image frame) are used. The captured image at the different position is an image captured from a position that is different from the captured image at the current position.

The captured image at the different position is also referred to as a second image. The different position is referred to as a second position. The number of second images may be one, or two or more. In FIG. 5, the captured image at the different position (second image) is expressed as a single image G2. In the embodiment, in or after the initialization, the tracking of the pose of the object using a 3D model alone is carried out on the second image as well.

Next, coordinate conversion of the position of the 3D scene point SP3$c$ is carried out (S430). The position of the 3D scene point SP3$c$ found in S420 appears on the camera coordinate system Ccam as described above. In S430, based on the object pose (R:T) corresponding to the first image, the position of the 3D scene point SP3$c$ is converted to a position on a 3D model coordinate system Cmdl. With this conversion, the 3D scene point SP3$c$ turns into a 3D scene point SP3$m$.

Next, the correspondence between a 3D point and a 2D image point in the second image is taken (S440). The 3D point is a general term for 3D model points MP and 3D scene points SP3$m$. The 2D image point is a general term for object points OP2 included in the captured image and 2D scene points SP2. In the embodiment, the 2D image point is included in the second image. The object point OP2 is a point obtained by capturing an image of an object feature point OP. The object point OP2 may be the same as or different from the edge detected in the detection of the pose of the object (S200).

The relationship between the 3D model point MP and the object point OP2 in the second image is referred to as a first relationship. The relationship between the 3D scene point SP3$m$ and the 2D scene point SP2 in the second image is referred to as a second relationship. By finding the first and second relationships, the relationship between the 3D model coordinate system and the camera coordinate system is found by the number of corresponding points.

Next, the object pose (R:T) is updated (S450). That is, in S450, the object pose (R:T) corresponding to the second image is corrected using the first and second relationships. Specifically, the object pose (R:T) is derived by iterative calculations such as the Gauss-Newton method in such a way was to minimize the difference (re-projection error) between the point obtained by projecting a 3D point onto the image plane and the 2D image corresponding to the 3D point. In the embodiment, since the pose of the object corresponding to the second image is separately obtained, as described above, the deriving of the pose of the object anew in S450 is described as "updating the pose", for the sake of convenience. Also, in the embodiment, after the 3D scene point SP3$m$ expressed by the 3D model coordinate system is found, the pose of the object can be tracked by minimizing the re-projection error using feature points from the object and feature points from the scene until the initialization is needed again. Thus, even if the object is partly or entirely shielded as viewed from the camera during the tracking of the object, the 3D pose of the object to the camera can be tracked and grasped.

Next, whether to end the pose update processing or not is determined (S460). If the pose update processing is not to end (S460, NO), the processing returns to S200. If the pose update processing is to end (S460, YES), the pose update processing is ended. If an instruction to end the processing is inputted from the user, YES is given in the determination of S460.

The HMD 100 superimposes the AR on the object OB and thus displays these, based on the pose derived by the pose update processing.

According to the embodiment described above, since information of the scene is used when deriving the pose of the object, the accuracy of tracking the pose of the object is improved.

The disclosure is not limited to the embodiments, examples and modifications given in this specification and can be realized with various configurations without departing from the scope of the disclosure. For example, technical features described in the embodiments, examples and modifications corresponding to technical features described in the summary section can be properly replaced or combined in order to partly or entirely solve the foregoing problems or in order to partly or entirely achieve the foregoing advantages. The technical features can be properly deleted unless described as essential in the specification. For example, the following example may be employed.

Figure 6:
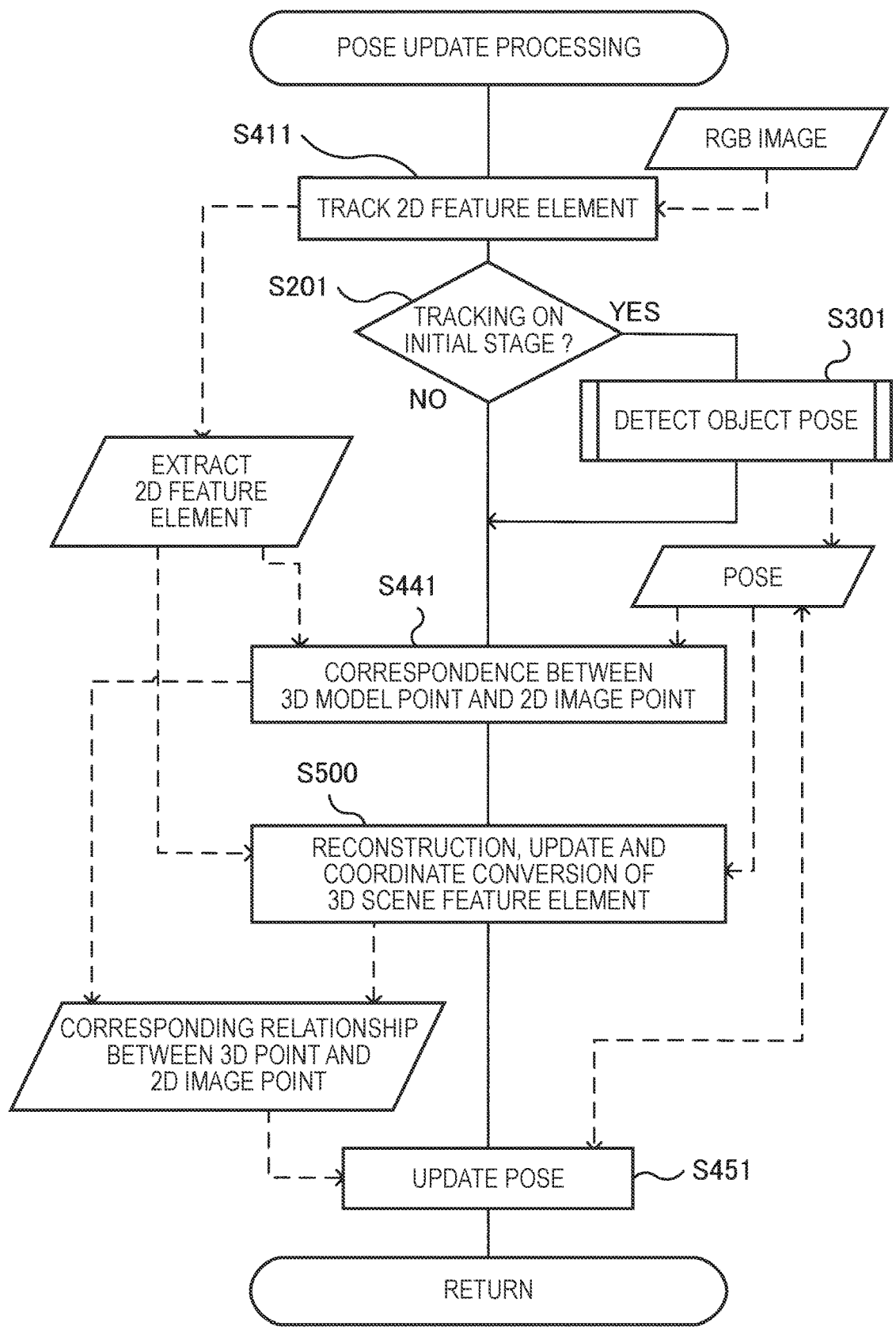
FIG. 6 is a flowchart showing pose update processing.

FIG. 6 is a flowchart showing the pose update processing. The processing shown in FIG. 6 is substantially the same as the processing shown in FIG. 3 as an embodiment but has a different way of expression. Therefore, some parts of the explanation of this example will be omitted when appropriate.

For the same or corresponding steps in FIGS. 3 and 6, the same numbers are used in the hundreds digit and tens digit of the step number. However, S500 in the flowchart of FIG. 6 is a step corresponding to S420, S430 and S440 in the embodiment.

As shown in FIG. 6, an RGB image is used in S411. As described with reference to S410 in the embodiment, object feature points OP, which are feature elements of the object OB, are tracked, using an RGB image (captured) image acquired by the camera 60. Then, in S411, 2D feature elements are extracted from the RGB image. The extracted feature elements are feature elements for each of the object OB and the scene SN.

In S441, the correspondence between the 3D model point MP and the object point OP2 is taken, of the processing described as S440 in the embodiment.

In S500, the 3D scene point SP3c is found by a triangulation method or bundle adjustment, using the pose derived in S301 or the pose derived in S451, described later. Moreover, in S500, the 3D scene point SP3c is converted to the 3D scene point SP3m expressed by the 3D model coordinate system. Then, the processing to take the correspondence between the 3D scene point SP3m and the 2D scene point SP2 is executed. That is, a part of S440, and S420 and S430 in the embodiment are carried out.

By S441 and S500, the corresponding relationship between the 3D point and the image point is obtained, as in the embodiment. This 3D-2D relationship is used to update the pose (S451), as in the embodiment. The pose derived in S451 also continues to be used to track the 3D pose of the object included in the next image frame until S301 is executed again as the initialization.

In the above description, a part or the entirety of the functions and processing realized by software may be realized by hardware. Also, a part or the entirety of the functions and processing realized by hardware may be realized by software. The hardware may include various circuits such as an integrated circuit, discrete circuit, or circuit module made up of a combination of those circuits.

The display device which executes the above processing may be a video see-through HMD. The video see-through HMD can be used in the case of displaying a VR image corresponding to an object or its vicinities on a scene image captured by the camera, according to the pose of the object. Alternatively, the device executing the above processing need not be the HMD (head-mounted display). Other than the HMD, a robot, portable display device (for example, smartphone), head-up display (HUD), or stationary display device may be employed.

The entire disclosure of Japanese patent application No. 2016-204772 is incorporated by reference herein.

What is claimed is:

1. A non-transitory computer readable medium that embodies instructions causing one or more processors to perform steps comprising:
    acquiring, from a camera, a plurality of image frames of an object and a scene, the scene being a background of the object;
    deriving a first 3D pose of the object based on: (i) at least one image in the plurality of image frames, and (ii) at least one 2D template based on a 3D model corresponding to the object without the scene;
    deriving 3D scene feature points of the scene based at least on a first image and a second image in the plurality of image frames, the first image being captured with the camera positioned at a first position and the second image being captured with the camera positioned at a second position after the first image is captured;
    deriving a second 3D pose of the object based on: (a) the second image, and (b) a most recent 3D pose of the object;
    obtaining a 3D-2D relationship between 3D points represented in a 3D coordinate system and image feature points on the second image; and
    updating the derived second pose based on the 3D-2D relationship, wherein
    the 3D points include the 3D scene feature points and 3D model points on the 3D model.

2. The non-transitory computer readable medium according to claim 1, wherein deriving the 3D scene feature points is performed based on a triangulation method or a bundle adjustment method.

3. The non-transitory computer readable medium according to claim 1, wherein the method further comprises:
    detecting a 3D pose of the object in the first image.

4. A method for tracking an object, comprising:
    acquiring, from a camera, a plurality of image frames of an object and a scene, the scene being a background of the object;
    deriving, by a processor, a first 3D pose of the object based on: (i) at least one image in the plurality of image frames, and (ii) at least one 2D template based on a 3D model corresponding to the object without the scene;
    deriving, by the processor, 3D scene feature points of the scene based at least on a first image and a second image in the plurality of image frames, the first image being captured with the camera positioned at a first position and the second image being captured with the camera positioned at a second position after the first image is captured;
    deriving, by the processor, a second 3D pose of the object based on: (a) the second image, and (b) a most recent 3D pose of the object;

obtaining, by the processor, a 3D-2D relationship between 3D points represented in a 3D coordinate system and image feature points on the second image; and updating, by the processor, the derived second pose based on the 3D-2D relationship, wherein the 3D points include the 3D scene feature points and 3D model points on the 3D model.

5. An object tracking device comprising:

a camera configured to acquire a plurality of image frames of an object and a scene, the scene being a background of the object; and a processor programmed to:

derive a first 3D pose of the object based on: (i) at least one image in the plurality of image frames, and (ii) at least one 2D template based on a 3D model corresponding to the object without the scene;

derive 3D scene feature points of the scene based at least on the first image and the second image in the plurality of image frames, the first image being captured with the camera positioned at a first position and the second image being captured with the camera positioned at a second position after the first image is captured;

derive a second 3D pose of the object based on: (a) the second image, and (b) a most recent 3D pose of the object;

obtain a 3D-2D relationship between 3D points represented in a 3D coordinate system and image feature points on the second image; and update the derived second pose based on the 3D-2D relationship, wherein the 3D points include the 3D scene feature points and 3D model points on the 3D model.

* * * * *